(12) United States Patent
Yamanaka et al.

(10) Patent No.: US 7,015,434 B2
(45) Date of Patent: Mar. 21, 2006

(54) METHOD OF JOINING TOGETHER MAGNETIC AND NONMAGNETIC MATERIALS

(75) Inventors: Shigeaki Yamanaka, Hiroshima (JP); Masahiro Dohi, Hiroshima (JP)

(73) Assignee: Kubota Iron Works Co., Ltd., Hiroshima (JP)

( * ) Notice: Subject to any disclaimer, the term of this patent is extended or adjusted under 35 U.S.C. 154(b) by 0 days.

(21) Appl. No.: 10/817,526

(22) Filed: Apr. 1, 2004

(65) Prior Publication Data

US 2004/0211773 A1 Oct. 28, 2004

(30) Foreign Application Priority Data

Apr. 23, 2003 (JP) .............................. 2003-118637

(51) Int. Cl.
*B23K 13/01* (2006.01)
(52) U.S. Cl. .................... 219/603; 219/606; 219/607
(58) Field of Classification Search ................ 219/606, 219/603, 600, 607, 604, 605, 612, 611, 689, 219/633, 765, 616–617; 29/428; 228/126, 228/127, 131
See application file for complete search history.

(56) References Cited

U.S. PATENT DOCUMENTS

| | | | |
|---|---|---|---|
| 3,681,559 A * | 8/1972 | Morris ........................ 219/607 |
| 3,780,422 A | 12/1973 | Herman |
| 3,872,275 A * | 3/1975 | Rudd .......................... 219/617 |
| 4,789,094 A * | 12/1988 | Chudakov .................... 228/2.5 |
| 5,571,437 A * | 11/1996 | Rudd .......................... 219/607 |
| 5,642,560 A | 7/1997 | Tabuchi et al. |
| 5,791,039 A | 8/1998 | Tabuchi et al. |
| 6,078,031 A * | 6/2000 | Bliault et al. ............... 219/607 |
| 6,199,261 B1 | 3/2001 | Slais |
| 6,420,686 B1 * | 7/2002 | Benoit et al. ............... 219/603 |

FOREIGN PATENT DOCUMENTS

JP 6-74257 A 3/1994

* cited by examiner

*Primary Examiner*—Daniel Robinson
(74) *Attorney, Agent, or Firm*—Frishauf, Holtz, Goodman & Chick, P.C.

(57) ABSTRACT

A method whereby magnetic and nonmagnetic materials can be joined together firmly and having their joining areas freed from embrittlement and with a minimum of deformation is disclosed. Applied to the process of fitting a ring of nonmagnetic material into an annular space formed between an inner and an outer member each made of magnetic material, the method includes bringing an inner and an outer peripheral surface of the ring of nonmagnetic material each into a semi-molten state and bringing the inner and outer peripheral surfaces of the ring of nonmagnetic material into pressure contact with the inner and outer members, respectively, to join the inner and outer peripheral surfaces to the inner and outer members, respectively, by interfacial fusion.

4 Claims, 10 Drawing Sheets

FIG. 3A  FIG. 3B  FIG. 3C
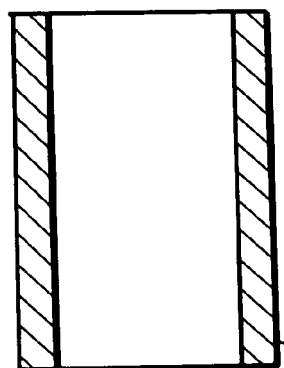
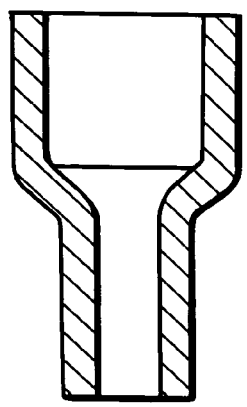
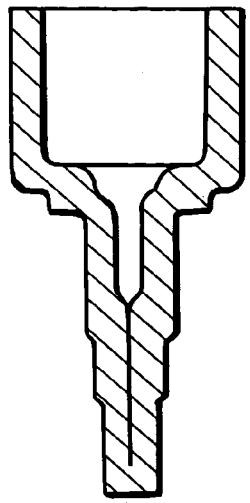
FIG. 3D  FIG. 3E
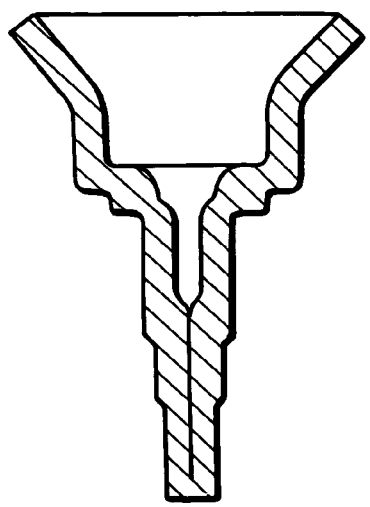
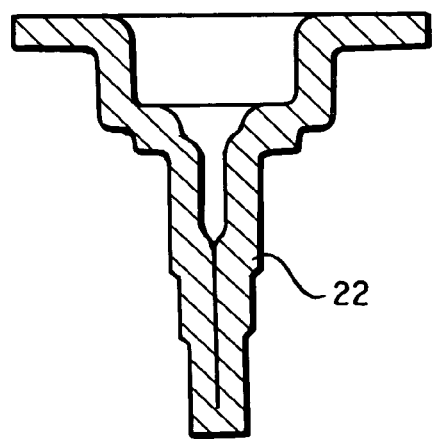

METHOD OF JOINING TOGETHER MAGNETIC AND NONMAGNETIC MATERIALS

BACKGROUND OF THE INVENTION

1. Field of the Invention

The present invention relates to a method of joining together magnetic and nonmagnetic materials, namely a magnetic material such as carbon steel for machine construction and a nonmagnetic material such as stainless steel or aluminum.

2. Description of the Prior Art

Such a magnetic and a nonmagnetic material are both metals, and for joining such dissimilar metals together, techniques has so far been known including a mechanical joining method, e.g., press fitting or calking, and also brazing, adhesive bonding, spot welding, friction welding and electron-beam welding methods.

Of these prior-art techniques, the mechanical joining methods present a problem of deformation during joining and are also hard to ensure sealing. The brazing method offers only a limited bonding strength and, relying on partial heating along a joining line, entails the problem that deformation is produced by the partial heating. The adhesive bonding method gives rise to problems in bonding strength and reliability of joining. In the methods such as spot welding, friction welding and electron-beam welding that require fusion to join, not only is the problem encountered that a brittle intermetallic compound formed at a weld prevents joining with reliability, but also it becomes the problem that depending on temperatures at which the weld is heated and cooled and time durations in which it is then held, respectively, its metallographic structure may be caused to change adversely so that the weld is cracked or becomes brittle. Especially in the electron-beam welding process, the problem of deformation by heating as in the brazing process is left unresolved together with the problem that excess weld metal portions must be cut for removal.

BRIEF SUMMARY OF THE INVENTION

In view of the foregoing, it is an object of the present invention to provide a method of joining magnetic and nonmagnetic materials together whereby the problems in the prior art mentioned above can be resolved.

In order to achieve the object mentioned above, there is provided in accordance with the present invention a method of joining magnetic and nonmagnetic materials together in a process wherein an annular space formed between an inner member and an outer member each made of magnetic material is fitted with a ring of nonmagnetic material, characterized in that the method comprises the steps of: bringing an inner and an outer peripheral surface of the ring of nonmagnetic material each into a semi-molten state; and bringing the inner and outer peripheral surfaces of the ring of nonmagnetic material into pressure contact with the inner and outer members, respectively, to join the inner and outer peripheral surfaces to the inner and outer members, respectively, by interfacial fusion.

According to the joining method of the present invention mentioned above whereby a ring of nonmagnetic material in the annular space has its respective mating surfaces with the inner and outer members of magnetic material interfacially fused with them, the magnetic and nonmagnetic materials are prevented from embrittlement in their joining areas and can be joined together firmly.

In a specific form of implementation of the joining method mentioned above, the ring of nonmagnetic material is heated to a temperature sufficient to make it semi-molten and the semi-molted ring of nonmagnetic material is then fitted into the annular space under pressure. In an alternative specific implementation of the mentioned above, the ring of nonmagnetic material is fitted under pressure into the annular space and thereafter is heated by high-frequency induction heating to a temperature sufficient to make it semi-molten and is then compressed under pressure.

According to such a specific joining method of the invention whereby a ring of nonmagnetic material heated until it is semi-molten is press-fitted into or compressed under pressure in the annular space between the inner and outer members of magnetic material, deformation of these members of magnetic material while they are being joined with the ring of magnetic nonmagnetic material is minimized.

In another specific form of implementation of the joining method mentioned above, the ring of nonmagnetic material is fitted under pressure into the annular space and thereafter a rotating body is pressed against an end face of the ring of nonmagnetic material whereby a frictional heat then generated heats the ring of nonmagnetic material to a temperature sufficient to make it semi-molten.

According to this specific joining method of the invention whereby a ring of nonmagnetic material is heated by the frictional heat to a temperature sufficient to make it semi-molten in the annular space between the inner and outer members of magnetic material, deformation of these members of magnetic material while they are being joined with the ring of magnetic nonmagnetic material is minimized. Also, the temperature of the ring of nonmagnetic material can be easily controlled by changing rotation number or pressure of the rotation body.

BRIEF DESCRIPTION OF THE DRAWINGS

These and other objects, features and advantages of the present invention as well as other manners of its implementation will become more readily apparent, and the invention itself will also be better understood, from the following detailed description when taken with reference to the drawings attached hereto showing certain illustrative forms of implementation of the present invention. In the drawings:

FIGS. 3A to 3E are a series of cross sectional views illustrating another process of forming an output shaft material in which it is formed from a tubular material;

DETAILED DESCRIPTION

Figure 1:
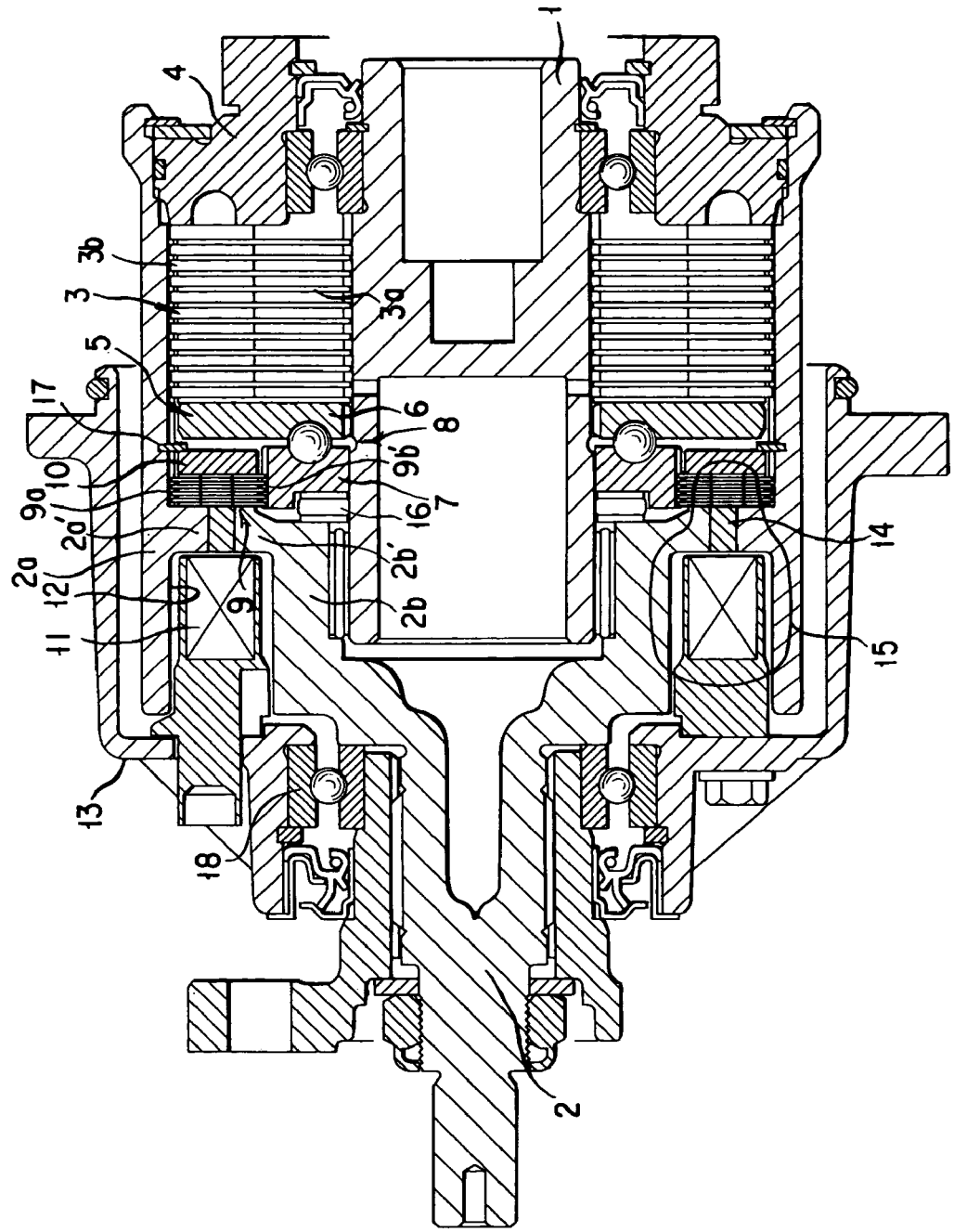
FIG. 1 is a cross sectional view illustrating an electromagnetic coupling to which the present invention is being applied.

An explanation is first given below in respect of a first form of implementation of the present invention with reference to the Drawing Figures. FIG. 1 shows an electromagnetic coupling to which the present invention is being applied. In FIG. 1, there are shown an input shaft 1 that is connected to an engine (not shown) side, an output shaft 2 for transmitting power to rear wheels, and a main clutch 3 for connecting and disconnecting the input shaft 1 to and from the output shaft 2. The main clutch 3 comprises inner plates 3a whose inner diametrical sides are coupled in spline engagement with the outer periphery of the input shaft 1 and outer plates 3b whose outer diametrical sides are coupled in spline engagement with the inner periphery of a casing 2a united to the output shaft 2 in a manner to be described later, the inner and outer plates 3a and 3b being alternately positioned. A fixed plate 4 is fastened to an end of the casing 2a and a thrust means 5 has a push plate 6 such that pressing the inner and outer plates 3a and 3b against the fixed plate 4 with the push plate 6 under a pressure engages the input shaft 1 with the output shaft 2 and removing the pressure or thrust disengages the output shaft 2 from the input shaft 1.

The thrust means 5 comprises the abovementioned push plate 6, a backing plate 7 disposed behind the push plate 6, and a thrust generating mechanism 8 for actuating the push plate 6 to push with the backing plate 7 via balls disposed between them.

The inner diametrical side of the push plate 6 is coupled in spline engagement with the outer periphery of the input shaft 1. And, the backing plate 7 with its end face supported by a thrust bearing 16 is supported rotatably relative to a boss section 2b of the output shaft 2 and has its inner diametrical side fitted with the outer periphery of the input shaft 1 so that it can be rotated while in sliding contact with the latter. Further, this backing plate 7 is coupled via an electromagnetic clutch (sub-clutch) 9 lying outwards thereof to the casing 2a united with the output shaft 2 so that it can engage with and disengage from the casing 2a in a direction in which it is rotated.

In the electromagnetic clutch 9, a retaining ring 10 is axially inserted into an annular space formed between the outer periphery of the backing plate 7 and an inner periphery of the casing 2a so that it can be axially moved in sliding contact with these peripheries in that space to an extent that it comes into contact with a stop ring 17. And, between the retaining ring 10 and a rotor section 2a' of the casing 2a there are positioned alternately clutch plates 9a whose inner diametrical sides are coupled in spline engagement with the outer periphery of the backing plate 7 and friction discs 9b whose outer diametrical sides are coupled in spline engagement with the inner periphery of the casing 2a. And, axially rearwards (at the left hand side as shown) of the rotor section 2a' of the casing 2a there is provided a ring-shaped electromagnetic coil 11 for electromagnetically attracting the retaining ring 10 towards the rotor section 2a' of the casing 2a to bring the clutch plates 9a and the friction discs 9b into pressure contact with one another, thereby turning the electromagnetic clutch 9 into its engaged state.

The electromagnetic coil 11 is disposed in a coil accommodating chamber 12 formed by a stepped recess formed in the casing 2a and an outer periphery of the boss section 2b of the output shaft 2 and arranged therein so that it is juxtaposed with the electromagnetic clutch 9 across the rotor section 2a'. And, this electromagnetic coil 11 is supported from a covering member 13 which is securely connected to a frame (not shown) and which is fitted over and rotatably coupled to the output shaft 2 via a bearing 18.

Between the rotor section 2a' of the casing 2a and a flange section 2b' of the boss section 2b of the output shaft 2 there lies a ring of nonmagnetic material 14 that is composed of stainless steel as a nonmagnetic material for preventing a magnetic force on a magnetic loop 15 of the electromagnetic coil 11 from short-circuiting. Thus, the output shaft 2 and the casing 2a which are separate members are united together via this ring of nonmagnetic material 14. While it was customary to form these members by mechanically machining a body formed by cold or hot forging, the present inventors formed such members by drawing or spinning as shown in FIGS. 2 to 7 with the advantage of an improved process yield, hence reduced material and working costs compared with forming them customarily by both forging and mechanical machining.

Figure 2A:
FIGS. 2A to 2C are a series of cross sectional views illustrating a process of forming an output shaft material in which it is formed from a disc shaped material.
Figure 2B:
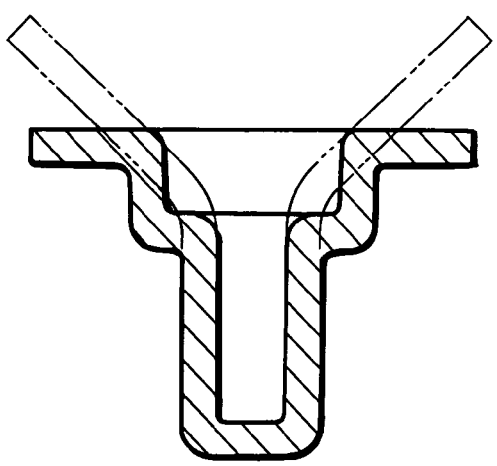
Figure 2C:
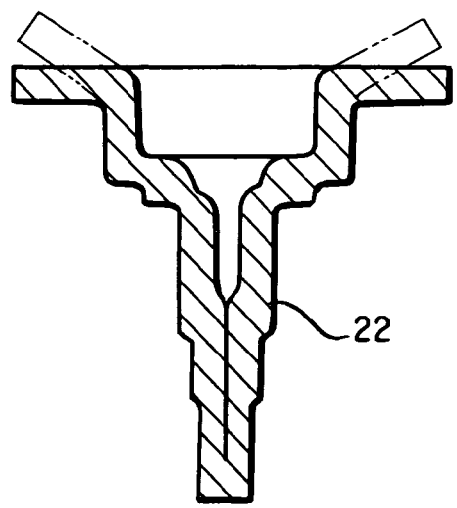

FIGS. 2A to 2C show a process of forming an output shaft material 22 in which a plate material 21 made of a disc-shaped steel plate is axially drawn out by drawing successively.

FIGS. 3A to 3E shows a process of forming an output shaft material 22 in which a tubular material 23 made of a steel tube such as an electro-resistance-welded tube is drawn while being reduced in diameter successively by spinning.

Figure 4A:
FIGS. 4A to 4E are like views illustrating a process of forming a casing material in which it is formed from a disc shaped material.
Figure 4B:
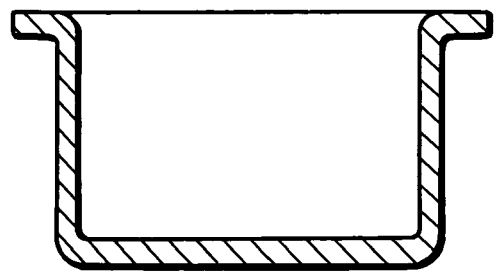
Figure 4C:
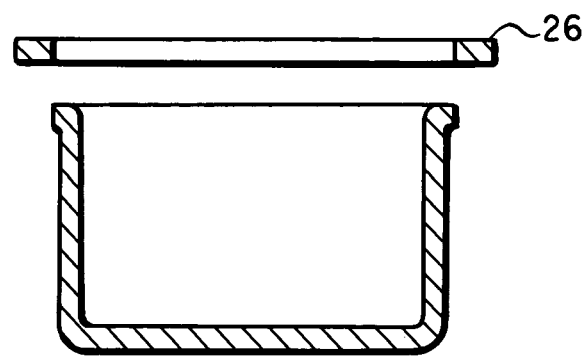
Figure 4D:
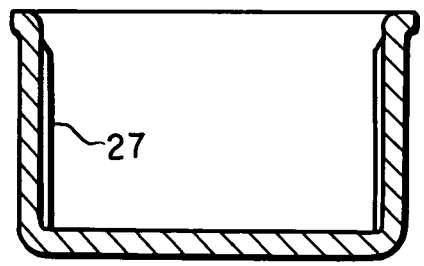
Figure 4E:
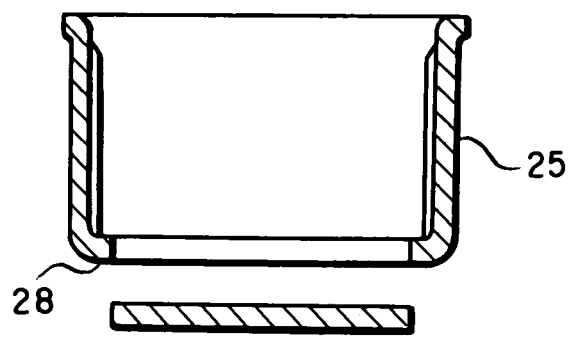
Figure 5A:
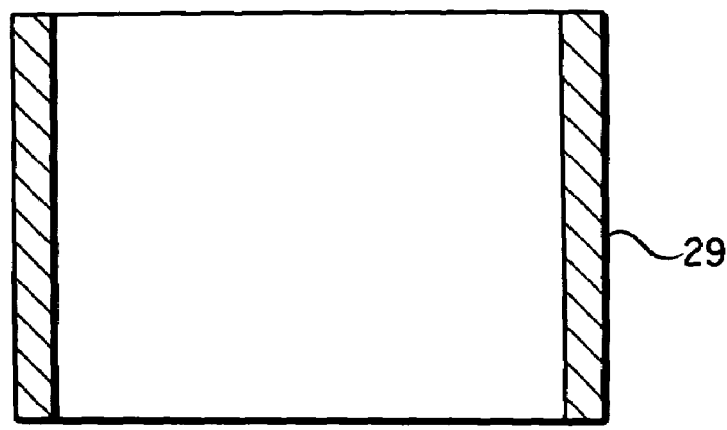
FIGS. 5A to 5C are like views illustrating another process of forming a casing material in which it is formed from a tubular material.
Figure 5B:
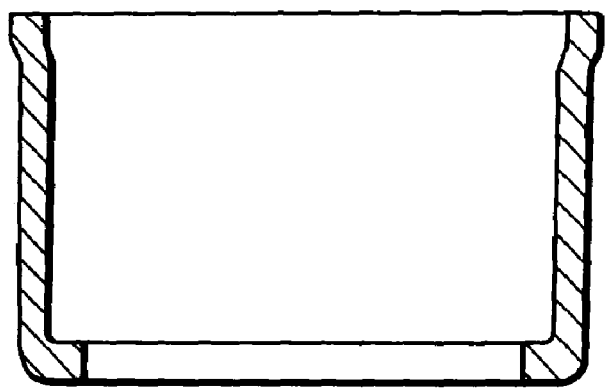
Figure 5C:
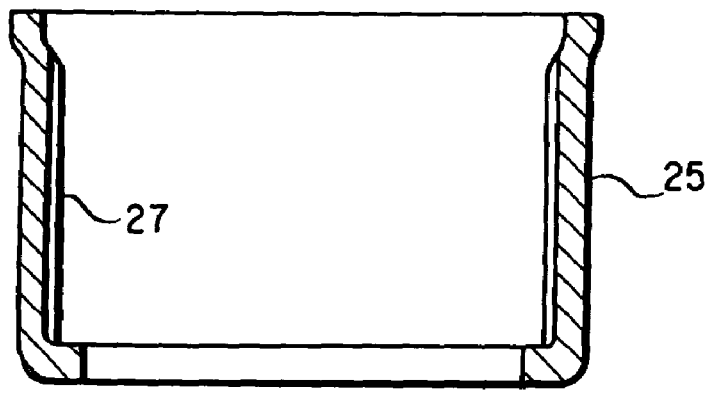

FIGS. 4A to 4E shows a process of forming a casing material 25 by axially drawing a plate material 24 made of a disc shaped steel plate in which FIG. 4B indicates a deep drawing step, FIG. 4C indicates a step of trimming a flange 26 by a press, FIG. 4D indicates a step of forming spline lines 27 wherein a drawn plate is loaded with a spline die in its inside and a spinning roller is applied to its outside to reduce its diameter, and FIG. 4E indicates a step wherein its bottom 28 is trimmed by the press FIGS. 5A to 5C shows process steps whereby a tubular material 29 made of a steel tube such as an electro-resistance-welded tube is drawn while being reduced in diameter with a spinning roll to form a casing material 25 having spline grooves 27.

Figure 6A:
FIGS. 6A to 6D are like views illustrating a further process of forming a casing material in which it is formed by spinning a disc shaped material.
Figure 6B:
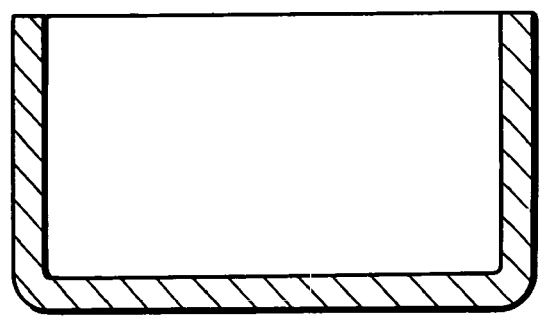
Figure 6C:
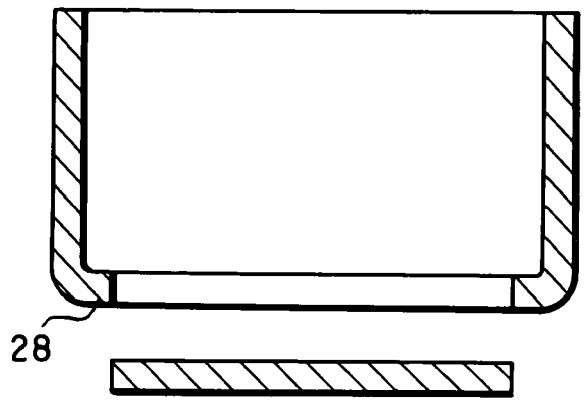
Figure 6D:
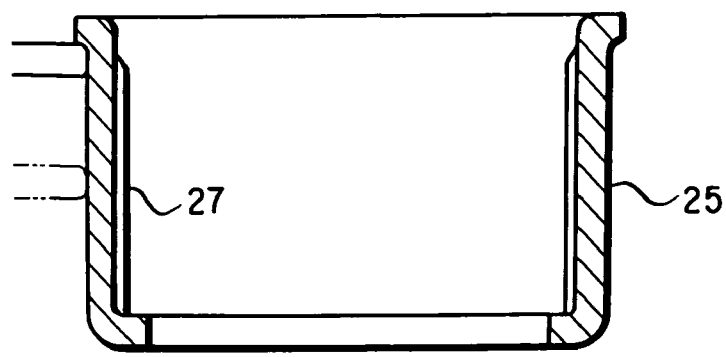

FIGS. 6A to 6D shows process steps wherein a plate material 24 made of a disc-shaped steel plate is drawn successively by spinning to form a casing material 25 in which FIG. 6C indicates a step wherein a bottom 28 is trimmed by a press.

Figure 7A:
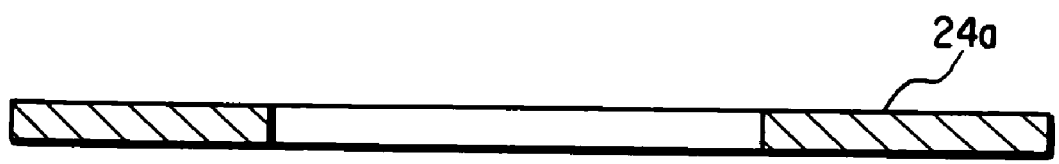
FIGS. 7A and 7B are like views illustrating an alternative process of forming a casing material in which it is formed by spinning a perforated disc material.
Figure 7B:
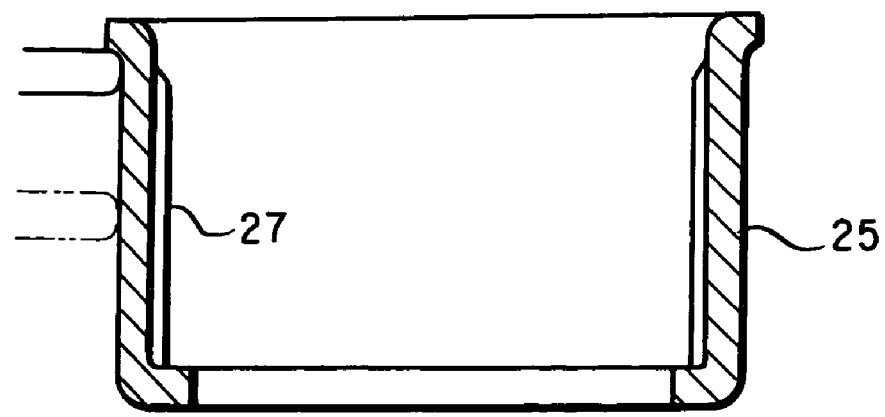
Figure 8:
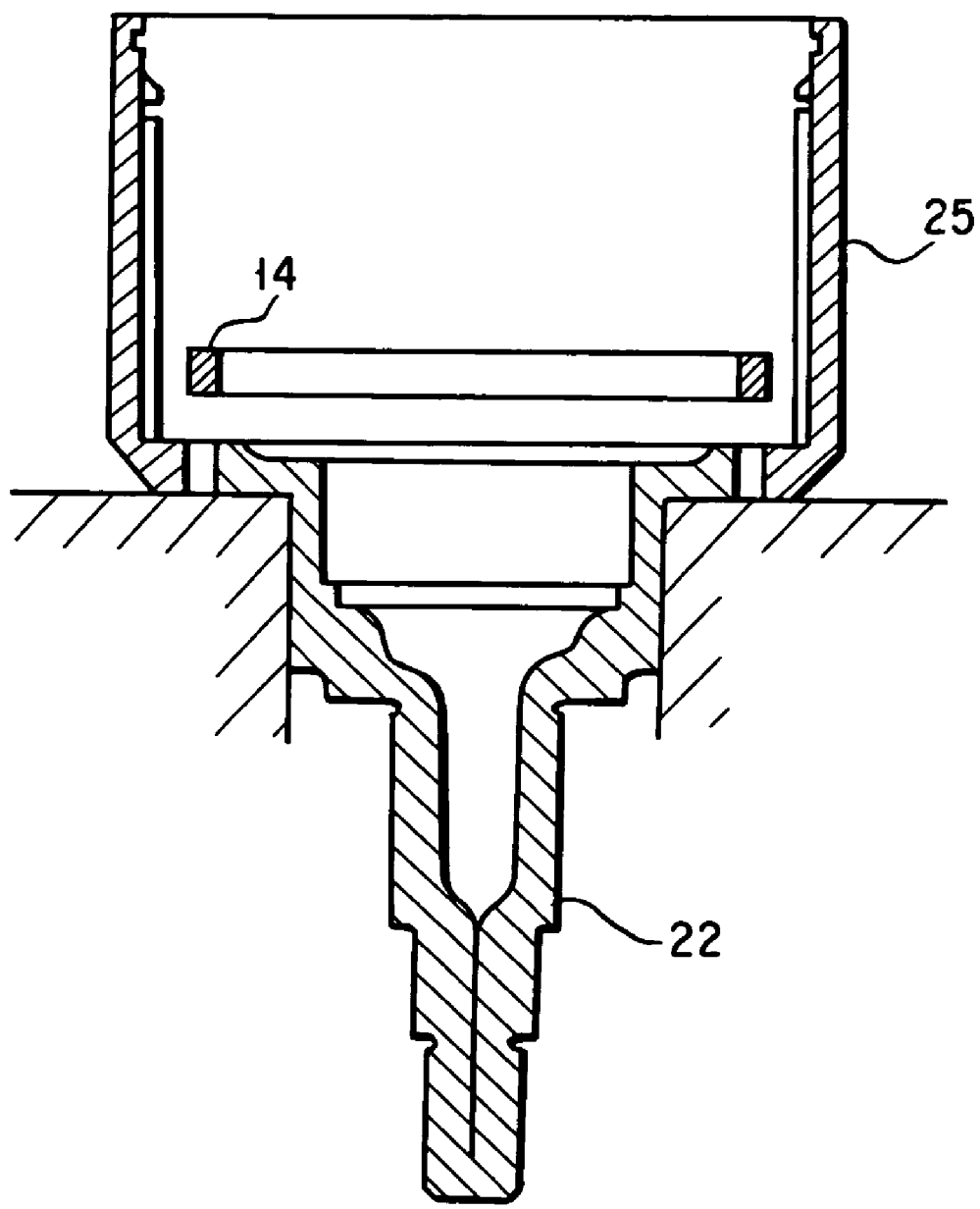
FIG. 8 is a view illustrating a first form of implementation of the joining method according to the present invention.

FIGS. 7A and 7B indicates a case that an apertured disc plate 24a with a hole preformed is used to omit the step of trimming of the bottom in spinning to form the casing material 25.

Next, the outer peripheral surface of the flange of the output shaft material 22 so formed and the inner peripheral surface of the open bottom of the casing material 25 so formed as mentioned above are each surface-finished so that a ring of nonmagnetic material 14 can be inserted between those materials 22 and 25 with its inner and outer peripheral surfaces tightly fitted with those outer and inner peripheral surfaces. Then, the peripheral surfaces are finished so that the finishing stock removal gives rise to a dimensional tolerance of their tight fit with the inner and outer peripheral surfaces of the ring of nonmagnetic material 14.

Thereafter, the output shaft material 22 and the casing material 25 are placed on a platen so that the flange section of the former and the open bottom of the latter rest thereon coaxially. In this state, the ring of nonmagnetic material 14 is heated by high-frequency induction heating or the like to a temperature sufficient to bring it into a semi-molten state and is fitted under pressure into the annular or ring shaped space between the output shaft material 22 and the casing material 25. Then, while the inner and outer peripheral surfaces of the ring of nonmagnetic material 14 are each in a semi-molten state, the materials 22 and 25 is practically at a room or ordinary temperature.

The ring of nonmagnetic material 14 is brought into semi-molten state at a temperature of 1350 to 1450° C. if it is composed of stainless steel (SUS304), at a temperature of 560 to 660° C. if it is of aluminum and at a temperature of 980 to 1080° C. if it is of copper.

Thus, the inner and outer peripheral surfaces of the ring of nonmagnetic material 14 fitted under pressure into the annular space between the two materials 22 and 25 are joined with the outer peripheral surface of the output shaft material 22 and the inner peripheral surface of the casing member 25, respectively, by interfacial fusion, and the ring of nonmagnetic material 14 is thereby firmly anchored in this annular space.

Figure 9:
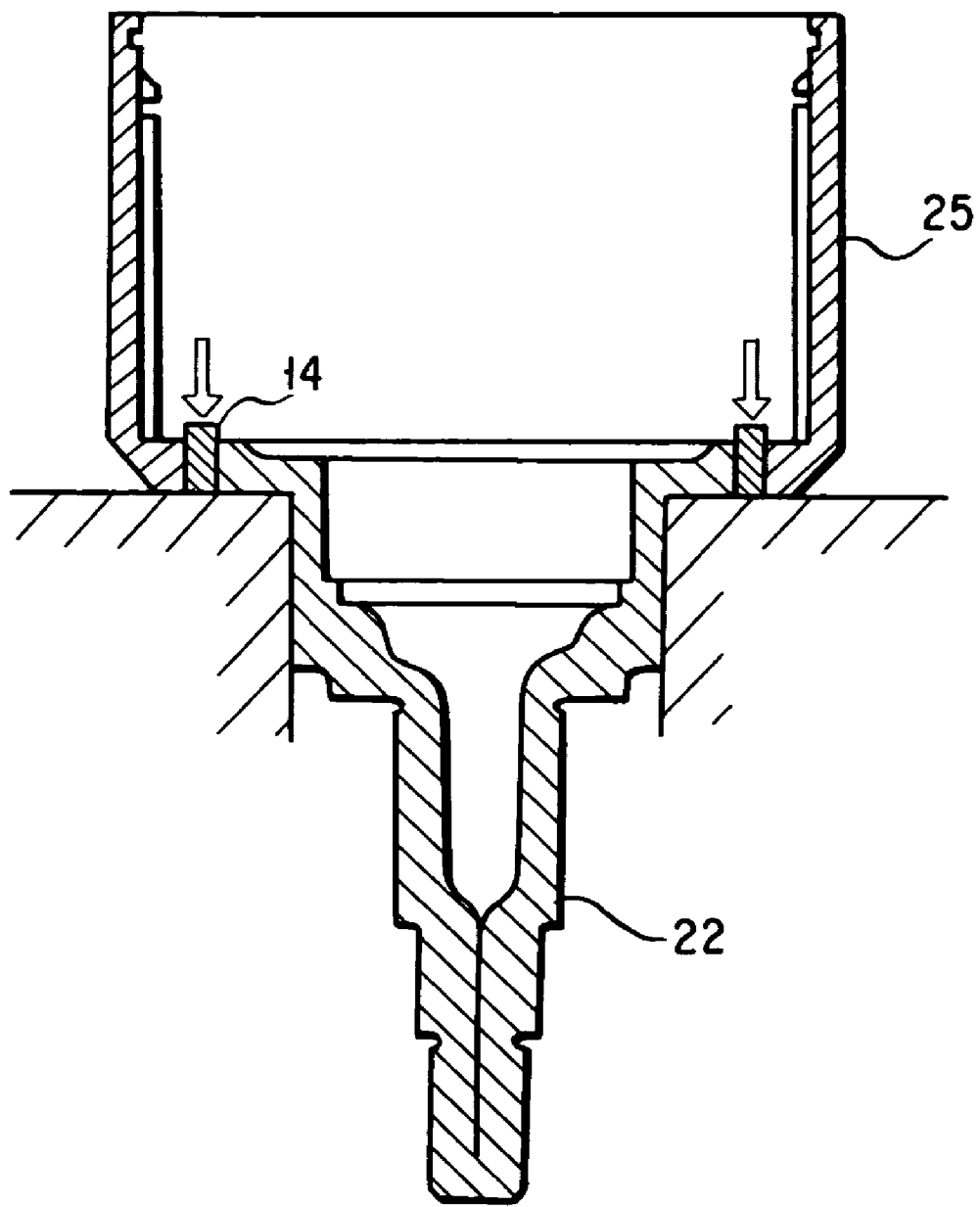
FIG. 9 is a view illustrating a second form of implementation of the joining method according to the present invention.

FIG. 9 shows a second form of implementation of the present invention. In the second form of implementation of the invention, as illustrated in FIG. 9 the ring of nonmagnetic material 14 is fitted under pressure at a room temperature into the annular space between the output shaft material 22 and the casing material 25, and is thereafter heated by high-frequency induction heating to a temperature sufficient to bring it into a semi-molten state and is then compressed under pressure. In this manner, the inner and outer peripheral surfaces of the ring of nonmagnetic material 14 are joined with the outer peripheral surface of the output shaft material 22 and the inner peripheral surface of the casing member 25, respectively, by interfacial fusion, and the ring of nonmagnetic material 14 is thereby firmly anchored in this annular space.

Figure 10:
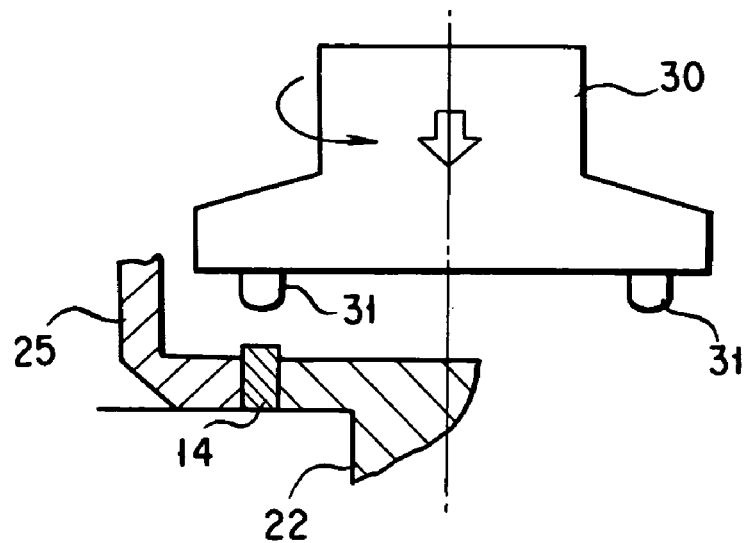
FIG. 10 is a view illustrating a third form of implementation of the joining method according to the present invention.

FIG. 10 shows a third form of implementation of the present invention. In this form of implementation of the invention, as shown in FIG. 10 the ring of nonmagnetic material 14 is fitted under pressure at a room temperature into the annular space between the output shaft material 22 and the casing material 25. Thereafter, a plurality of pins 31 embedded on an end face of a rotary body 30 along a circle corresponding to that of the ring 14 are brought under pressure into contact with or pressed against the open end face of the ring of nonmagnetic material 14 while the rotary body 30 is being rotated.

This causes the ring of nonmagnetic material 14 to be heated from its open end face by the frictional heat that develops between the end face and the pins 31. And, this heating operation is continued until the ring of nonmagnetic material is heated to a temperature sufficient to bring it into a semi-molten state. Thus, the ring of nonmagnetic material 14 comes to be heated over its entire body gradually to a temperature sufficient to make it semi-molten due to the circumferential movements of the pins 31 relative to the ring 14 in pressure contact therewith. In this way, the inner and outer peripheral surfaces of the ring of nonmagnetic material 14 are joined with the outer peripheral surface of the output shaft material 22 and the inner peripheral surface of the casing member 25, respectively, by interfacial fusion, and the ring of nonmagnetic material 14 is thereby firmly anchored in this annular space.

Figure 11:
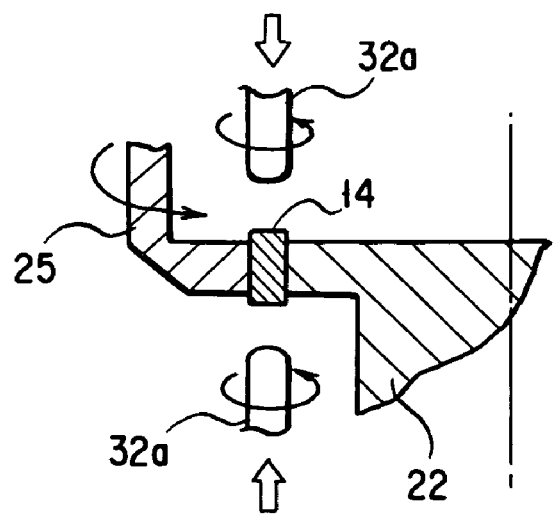
FIG. 11 is a view illustrating a fourth form of implementation of the joining method according to the present invention.

FIG. 11 shows a fourth form of implementation of the present invention. In this form of implementation of the invention, as shown in FIG. 11 the ring of nonmagnetic material 14 is fitted under pressure into the annular space between the output shaft material 22 and the casing material 25. Thereafter, a pair of rotating pins 32a and 32b are brought into pressure contact with or pressed against the upper and lower end faces of the ring 14, respectively, while they are being moved annularly or along the annular end faces of the ring of nonmagnetic material 14, respectively, to cause the ring of nonmagnetic material 14 to be heated from its opposite end faces by the frictional heat to a temperature sufficient to make it semi-molten. Then, relative to the rotating pins 32a and 32b, the materials 22 and 25 joined together may be rotated. Thus, the ring of nonmagnetic material 14 comes to be heated over its entire body gradually to a temperature sufficient to make it semi-molten due to the circumferential movements of the pins 32a and 32b relative to the ring 14 in pressure contact therewith. In this way, the inner and outer peripheral surfaces of the ring of nonmagnetic material 14 are joined with the outer peripheral surface of the output shaft material 22 and the inner peripheral surface of the casing member 25, respectively, by interfacial fusion, and the ring of nonmagnetic material 14 is thereby firmly anchored in this annular space.

Although the present invention has hereinbefore been set forth with respect to certain illustrative embodiments thereof, it will readily be appreciated to be obvious to those skilled in the art that many alterations thereof, omissions therefrom and additions thereto can be made without departing from the essences and scope of the present invention. Accordingly, it should be understood that the invention is not intended to be limited to the specific embodiments thereof set forth above, but to include all possible embodiments that can be made within the scope with respect to the features specifically set forth in the appended claims and to encompass all the equivalents thereof.

What is claimed is:

1. A method of joining a magnetic inner member and a magnetic outer member via a nonmagnetic material, said method comprising:

inserting a ring of the nonmagnetic material into an annular space formed between the inner member and the outer member so as to be tightly fitted therein;

bringing each of an inner and an outer peripheral surface of the ring of nonmagnetic material each into a semi-molten state; and bringing the inner and outer peripheral surfaces of said ring of nonmagnetic material into pressure contact with said inner and outer members, respectively, to join said inner and outer peripheral surfaces to said respective inner and outer members by interfacial fusion.

2. A method of joining a magnetic inner member and a magnetic outer member via a nonmagnetic material by fitting a ring of the nonmagnetic material in an annular space formed between the inner member and the outer member, said method comprising:

bringing each of an inner and an outer peripheral surface of the ring of nonmagnetic material into a semi-molten state; and bringing the inner and outer peripheral surfaces of said ring of nonmagnetic material into pressure contact with said inner and outer members, respectively, to join said inner and outer peripheral surfaces to said respective inner and outer members by interfacial fusion;

wherein the ring of nonmagnetic material is heated to a temperature sufficient to make it semi-molten, and the semi-molted ring of nonmagnetic material is then fitted into said annular space under pressure.

3. A method of joining a magnetic inner member and a magnetic outer member via a nonmagnetic material by fitting a ring of the nonmagnetic material in an annular space formed between the inner member and the outer member, said method comprising:
bringing each of an inner and an outer peripheral surface of the ring of nonmagnetic material into a semi-molten state; and
bringing the inner and outer peripheral surfaces of said ring of nonmagnetic material into pressure contact with said inner and outer members, respectively, to join said inner and outer peripheral surfaces to said respective inner and outer members by interfacial fusion;
wherein the ring of nonmagnetic material is fitted under pressure into said annular space, and thereafter is heated by high-frequency induction heating to a temperature sufficient to make it semi-molten and is then compressed under pressure.

4. A method of joining a magnetic inner member and a magnetic outer member via a nonmagnetic material by fitting a ring of the nonmagnetic material in an annular space formed between the inner member and the outer member, said method comprising:
bringing each of an inner and an outer peripheral surface of the ring of nonmagnetic material into a semi-molten state; and
bringing the inner and outer peripheral surfaces of said ring of nonmagnetic material into pressure contact with said inner and outer members, respectively, to join said inner and outer peripheral surfaces to said respective inner and outer members by interfacial fusion;
wherein the ring of nonmagnetic material is fitted under pressure into said annular space, and thereafter a rotating body is pressed against an end face of said ring of nonmagnetic material to generate a frictional heat to heat said ring of nonmagnetic material to a temperature sufficient to make it semi-molten.

* * * * *